(12) United States Patent
Keum (10) Patent No.: US 10,547,038 B2
(45) Date of Patent: Jan. 28, 2020

(54) BATTERY PACK INCLUDING FIXING PART

(71) Applicant: LG CHEM, LTD., Seoul (KR)

(72) Inventor: Jong Yoon Keum, Chungcheongbuk-Do (KR)

(73) Assignee: LG Chem, Ltd., Seoul (KR)

(*) Notice: Subject to any disclaimer, the term of this patent is extended or adjusted under 35 U.S.C. 154(b) by 0 days.

(21) Appl. No.: 16/186,929

(22) Filed: Nov. 12, 2018

(65) Prior Publication Data

US 2019/0148689 A1    May 16, 2019

(30) Foreign Application Priority Data

Nov. 14, 2017   (KR) .................... 10-2017-0151794

(51) Int. Cl.
*H01M 2/10* (2006.01)
*H01M 10/0525* (2010.01)
*H01M 2/04* (2006.01)

(52) U.S. Cl.
CPC ......... *H01M 2/1077* (2013.01); *H01M 2/043* (2013.01); *H01M 2/1083* (2013.01); *H01M 10/0525* (2013.01); *H01M 2220/20* (2013.01)

(58) Field of Classification Search
CPC .. H01M 2/1077; H01M 2/043; H01M 2/1083; H01M 10/0525
See application file for complete search history.

(56) References Cited

U.S. PATENT DOCUMENTS

| | | | | |
|---|---|---|---|---|
| 4,498,123 A * | 2/1985 | Fuss | ..................... | H05K 7/1421 361/725 |
| 4,510,215 A * | 4/1985 | Adam | ................... | H01M 2/105 429/100 |
| 2010/0136420 A1 * | 6/2010 | Shin | ..................... | H01M 2/1077 429/178 |
| 2013/0280565 A1 * | 10/2013 | Lee | ..................... | H01M 2/0207 429/71 |
| 2017/0047563 A1 * | 2/2017 | Lee | ....................... | H01M 2/206 |

FOREIGN PATENT DOCUMENTS

| | | | | | |
|---|---|---|---|---|---|
| FR | 2988915 | A3 | * | 10/2013 | .......... H01M 2/0242 |
| JP | H-05-159755 | A | * | 6/1993 | .............. H01M 2/02 |
| JP | 2001313018 | A | * | 11/2001 | .............. H01M 2/10 |
| JP | 2003-157815 | A | | 5/2003 | |
| JP | 2010-173536 | A | | 8/2010 | |
| JP | 2012124071 | A | * | 6/2012 | .............. H01M 2/10 |
| JP | 2012-212693 | A | | 11/2012 | |
| KR | 10-2006-0037599 | A | | 5/2006 | |
| KR | 20170043313 | A | * | 4/2017 | .............. H01M 2/10 |
| WO | WO-2015170852 | A1 | * | 11/2015 | ............ H01M 2/206 |

OTHER PUBLICATIONS

Origuchi Masato, FR 2988915 translation, translated Mar. 18, 2019, published Oct. 4, 2013 (Year: 2013).*

* cited by examiner

*Primary Examiner* — Jimmy Vo
(74) *Attorney, Agent, or Firm* — Morgan, Lewis & Bockius LLP

(57) ABSTRACT

A battery pack includes a fixing part, and more particularly, a battery pack includes a fixing member and a fixing part, which fix an entire structure in top/bottom, left/right, and front/rear directions. A space defined in the battery pack is filled. As such, the battery pack may provide a power source that is safe against vibration, has a high capacity, and is fast in assembling.

18 Claims, 5 Drawing Sheets

BATTERY PACK INCLUDING FIXING PART

CROSS-REFERENCE TO RELATED APPLICATION

This application claims priority to Korean Patent Application No. 10-2017-0151794 filed on Nov. 14, 2017 and all the benefits accruing therefrom under 35 U.S.C. § 119, the contents of which are incorporated by reference in their entirety.

BACKGROUND

The present disclosure relates to a battery pack including a fixing part, and more particularly, to battery pack including a fixing part and a fixing member, which fix an entire structure in top/bottom, left/right, and front/rear directions.

A lithium secondary battery, as a unit battery constituting a battery pack, has flexibility and thus has a relatively free shape. Furthermore, the lithium secondary battery is light in weight and excellent in safety.

The lithium secondary battery is increasingly used as a power source for mobile electronic devices such as a mobile phone, a camcorder, a notebook computer. That is, the lithium secondary battery is used for mid and large sized devices such as a vehicle or a power storage system as well as small sized devices such as mobile electronic devices.

The secondary battery is classified according to a shape of a battery case. When an electrode assembly is disposed in a cylindrical or polygonal metallic can, the secondary battery is classified into a cylindrical or polygonal battery.

Also, when the electrode assembly is disposed in a pouch-type case made of an aluminum laminate sheet, the secondary battery is classified into a pouch-type battery.

Also, the electrode assembly disposed in the battery case may have a structure including an anode, a cathode, and a membrane inserted therebetween and be charged or discharged. The cylindrical electrode assembly has a jelly roll shape, in which an anode having a sheet shape on which an electrode active material is applied, a membrane, and a cathode are laminated and wound.

The above-described battery is classified into one battery cell, a plurality of battery cells are connected in series and/or parallel to form one module, and a plurality of modules are connected to form one battery pack.

Since the plurality of battery modules form one battery pack, the plurality of battery modules are accommodated in a pack case for protection. The pack case includes an upper pack case and a lower pack case.

Connection between the plurality of battery modules disposed in the pack case and the pack case will be described in detail with reference to FIG. 1.

Figure 1:
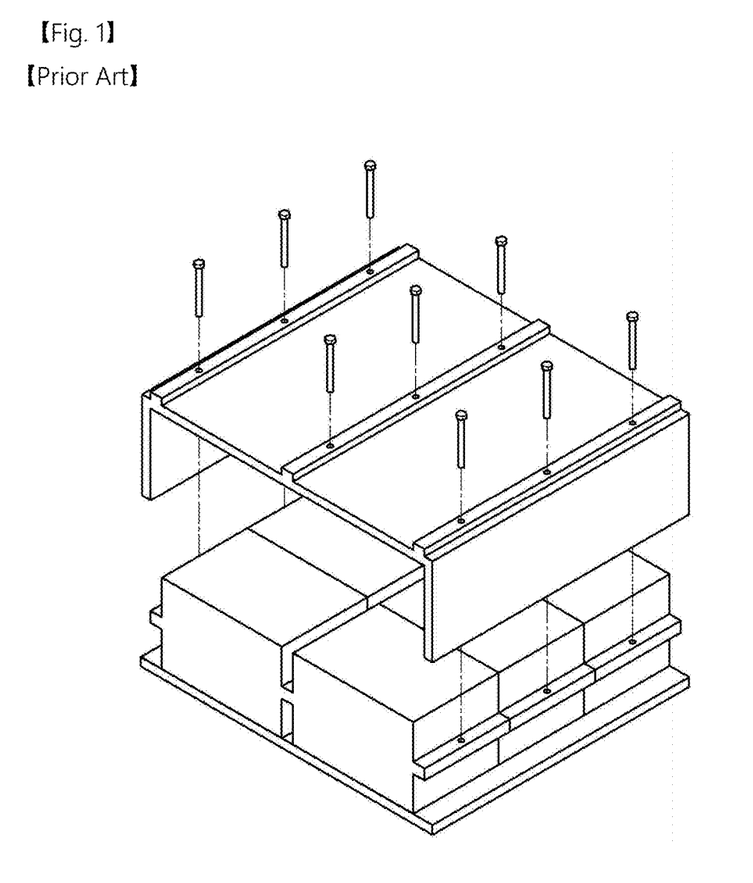
FIG. 1 is a structural view illustrating a typical battery pack.

FIG. 1 is a structural view illustrating a typical battery pack.

Referring to FIG. 1, the typical battery pack includes a module through-hole, which is defined in a side surface part of the battery module for connection between the battery module and the pack case. Also, each of the upper pack case and the lower pack case, which constitute the pack case, includes a pack through-hole at a position corresponding to the module through-hole.

Thereafter, the plurality of battery modules are disposed on the lower pack case, the upper pack case is placed on the arranged battery modules, and then the upper pack case and the lower pack case are coupled through screws and bolts.

However, the above-described coupling has a limitation in that the screws or the bolts are released when vibration or impact is applied to the battery pack.

Thus, technology for more firm coupling between the battery pack and the battery module is required to be developed.

RELATED ART DOCUMENT

Patent Document (Patent document 1) KR2006-0037599 A

SUMMARY

The present disclosure provides a battery pack including a fixing part allowing battery modules to be more firmly coupled to each other.

In accordance with one exemplary embodiment, a battery pack, which includes a plurality of battery modules in which a plurality of battery cells are accommodated in a module case, includes: an upper case 110 having a top surface, both side surfaces, front/rear surfaces, and an opened bottom surface to accommodate the plurality of battery modules, wherein a chamfer 111 having a predetermined length is provided on each of portions at which the top surface contacts the both side surfaces in a side longitudinal direction; a first chamfer over-pressing preventing part 121 disposed at one side of an upper end of a first module case in the battery modules forming one row and extending in an upward diagonal direction from the module case in correspondence to the chamfer of the upper case; a first battery module including a first module over-pressing preventing part 122 disposed at the other side of the upper end of the first module case and extending in a side direction from the module case so as to be fixed by contacting another battery module case adjacent thereto; a second chamfer over-pressing preventing part 131 disposed at one side of an upper end of a second module case in the battery modules forming another row and extending in an upward diagonal direction from the module case in correspondence to the chamfer of the upper case; a second battery module including a second module over-pressing preventing part 132 disposed at the other side of the upper end of the second module case and extending in a side direction from the module case in correspondence to the first module over-pressing preventing part, the second battery module being disposed adjacent to the first battery module; and a lower plate 140 including a plurality of module support parts 141 configured to fix a lower end of each of the first battery module and the second battery module.

As each of the plurality of module support parts 141 has a top surface greater in area than a bottom surface, a module coupling surface 141_1, which is coupled to a lower end of the battery module, may be inclined with respect to a perpendicular direction of a surface of the lower plate 140, and the module support part 141 may extend in a longitudinal direction from one side surface to the other side surface of the battery pack.

Each of the first battery module and the second battery module may further include a lower end coupling part 123, 133, which has a shape corresponding a module support part of the lower plate, disposed at both side ends of the module case, and an outer surface of the lower coupling part 123, 133 may be inclined with respect to a perpendicular direction of the lower plate so that the outer surface of the lower coupling part 123, 133 is coupled to a module coupling surface 141_1 of the module support part in a corresponding manner.

A first module over-pressing preventing part of the first battery module may include a protruding portion so as to be coupled with a second module over-pressing part of the second battery module, the second module over-pressing preventing part of the second battery module may include a recessed portion so as to be coupled with the protruding portion of the first over-pressing part, the second module over-pressing preventing part of the second battery module may include a protruding portion so as to be coupled with the first over-pressing part of the first battery module, and the first module over-pressing preventing part of the first battery module may include a recessed portion so as to be coupled with the protruding portion of the second over-pressing part.

The battery pack may further include a module fixing member provided between the upper case and the first and second battery modules to prevent the battery modules from moving in top/bottom directions.

The module fixing member may be made of a compressible material.

In accordance with another exemplary embodiment, a battery pack, which includes a plurality of battery modules in which a plurality of battery cells are accommodated in a module case and which are arranged in a row, includes: a lower plate 240 including a plurality of module support parts 241 configured to fix a lower end of each of the plurality of battery modules; a first outer coupling part 223 disposed at one side of a lower end of a first module case in the battery modules forming one row and extending in a side direction from the module case in correspondence to the module support part of the lower plate; a first battery module 220 including a first bent part 224 disposed at the other side of the lower end of the first module case and bent by a predetermined range in an inward direction of the module case so that a body of the module support part 241 of the lower plate is partially disposed therein; a second outer coupling part 233 disposed at one side of a lower end of a second module case in the battery modules forming another row while being disposed next to the first battery module and extending in a side direction from the module case in correspondence to the module support part of the lower plate; and a second battery module 230 including a second bent part 234 disposed at the other side of the lower end of the second module case and bent by a predetermined range in an inward direction of the module case so that the body of the module support part 241 of the lower plate is partially disposed therein.

As each of the plurality of module support parts 241 has a top surface greater in area than a bottom surface, a module coupling surface 241_1, which is coupled to each of the first outer coupling part 223 and the second outer coupling part 233, may be inclined with respect to a perpendicular direction of a surface of the lower plate 240.

The module support part 241 may extend in a longitudinal direction from one side surface to the other side surface of the battery pack.

The first battery module may include a first bent coupling part 224_1 disposed at a lower end of the first bent part 224 and extending in a side direction from the first module case in correspondence to the module support part 241 of the lower plate, the second battery module may include a second bent coupling part 234_1 disposed at a lower end of the second bent part 234 and extending in a side direction from the second module case in correspondence to the module support part 241 of the lower plate, and an outer surface of each of the first outer coupling part 223, the second outer coupling part 233, the first bent coupling part 224_1, and the second bent coupling part 234_1 may be inclined with respect to a perpendicular direction of the lower plate so as to be coupled to a module coupling surface 241_1 of the module support part in a corresponding manner.

In accordance with yet another exemplary embodiment, a battery pack, which includes a plurality of battery modules in which a plurality of battery cells are accommodated in a module case and which are arranged in three rows or more, includes: side battery modules 320, which are arranged on a side surface of the battery pack in a longitudinal direction, including a chamfer over-pressing preventing part 321 disposed at one side of an upper end of a side module case in the side battery modules and extending in an upward diagonal direction from the side module case in correspondence to the chamfer 311 provided on an inner corner of the upper case accommodating the plurality of battery modules, and a first module over-pressing preventing part 322 disposed at the other side of the upper end of the side module case in the side battery modules and extending in a side direction from the side module case so as to be fixed while contacting another battery module case adjacent thereto; and central battery modules 330, which are disposed between the side battery modules 320, including a second module over-pressing preventing part 331 disposed at each of both sides of an upper end of a central module case in the central battery modules and extending in a side direction from the central module case so as to be fixed while contacting another battery module case adjacent thereto, and each of the first module over-pressing preventing part 322 and the second module over-pressing preventing part 331 includes a coupling part that is insert-coupled with an over-pressing preventing part of the battery module adjacent thereto.

The battery pack may further include: an upper case 310 having a top surface, both side surfaces, front/rear surfaces, and an opened bottom surface to accommodate the side battery modules 320 and the central battery modules 330, wherein a chamfer 311 having a predetermined length is provided on each of portions at which the top surface contacts the both side surfaces in a side longitudinal direction; and a lower plate 340 including a plurality of module support parts 341 fixing a lower end of each of the plurality of battery modules.

As each of the plurality of module support parts 341 of the lower plate 340 has a top surface greater in area than a bottom surface, a module coupling surface 141_1, which is coupled to a lower end of the battery module, may be inclined with respect to a perpendicular direction of a surface of the lower plate 140, 340, and a lower end coupling part 123, 133 may be provided at each of both side ends of a lower end of the module case in the side battery modules 320 and the central battery modules 330, and inclined with respect to a perpendicular direction of the lower plate 140, 340 so that the outer surface is coupled to the module coupling surface 141_1 of the module support part.

As the module support part 241, 341 of the lower plate 340 has a top surface greater in area than a bottom surface, a module coupling surface 141_1, which is coupled to a lower end of the battery module, may be inclined with respect to a perpendicular direction of a surface of the lower plate 140, 340, a bent part 224, 234, which is bent by a predetermined range in an inward direction of the module case, may be provided at one side end of the lower end of the module case in the side battery modules 320 and the central battery modules 330 so that a body of the module support part 241, 341 of the lower plate is partially disposed therein, a coupling part 222, 233, which is inclined with respect to a perpendicular direction of the lower plate 240, 340, may be provided at the other side end of the lower end of the module case in the side battery modules 320 and the central battery modules 330 so that an outer surface is coupled to a module coupling surface 241_1 of the module support part in a corresponding manner.

The bent part 224, 234 may include a bent coupling part 224_1, 234_1, which is inclined with respect to the perpendicular direction of the lower plate 240, 340 so that the outer surface of the lower end is coupled to the module coupling surface 241_1 of the module support part in a corresponding manner.

The present disclosure also provides a battery pack in which a plurality of battery cells are constituted into a plurality of modules and a device including the battery pack as a power source and which is safe against vibration, has a high capacity, and fast in assembling.

Although preferred example of the device includes: an electric car including an electric vehicle (EV), a hybrid electric vehicle (HEV), and a plug-in hybrid electric vehicle (PHEV); an electric two-wheel vehicle including an electric bike (E-bike) and an electric scooter (E-scooter), and an electric golf cart, the exemplary embodiment is not limited thereto.

Since the mid-and-large sized battery pack and the device including the same are well-know in the corresponding technical field, detailed description for this will be omitted in this specification.

BRIEF DESCRIPTION OF THE DRAWINGS

Exemplary embodiments can be understood in more detail from the following description taken in conjunction with the accompanying drawings, in which.

DETAILED DESCRIPTION OF EMBODIMENTS

Hereinafter, exemplary embodiments will be described with reference to contents disclosed in the accompanying drawings. The invention may, however, be embodied in many different forms and should not be construed as being limited to the embodiments set forth herein. Rather, these embodiments are provided so that this disclosure will be thorough and complete, and will fully convey the scope of the present invention to those skilled in the art.

It will be understood that although the ordinal numbers such as first and second are used herein to describe various elements, these elements should not be limited by these numbers. The terms are only used to distinguish one component from other components. For example, a first element referred to as a first element in one embodiment can be referred to as a second element in another embodiment. In the following description, the technical terms are used only for explaining a specific exemplary embodiment while not limiting the present disclosure. The terms of a singular form may include plural forms unless referred to the contrary.

Meanwhile, for the terms used in the present disclosure, general terms widely currently used have been selected as possible as they can. In a specific case, terms arbitrarily selected by an applicant may be used. In this case, since the meaning thereof is described in detail in the detailed description of the specification, the present disclosure should be understood in an aspect of meaning of such terms, not the simple names of such terms. Meanwhile, for the terms used in the present disclosure, general terms widely currently used have been selected as possible as they can. In a specific case, terms arbitrarily selected by an applicant may be used. In this case, since the meaning thereof is described in detail in the detailed description of the specification, the present disclosure should be understood in an aspect of meaning of such terms, not the simple names of such terms.

<Embodiment 1>

Hereinafter, a battery pack in accordance with one exemplary embodiment will be described.

The battery pack in accordance with one exemplary embodiment may allow firm connection between the battery pack and a battery module as a connecting part for connecting the battery module to the battery pack is provided, a member corresponding to an inner empty space of the battery pack, and safely protect the connection between the battery pack and the battery module from vibration and impact.

Figure 2:
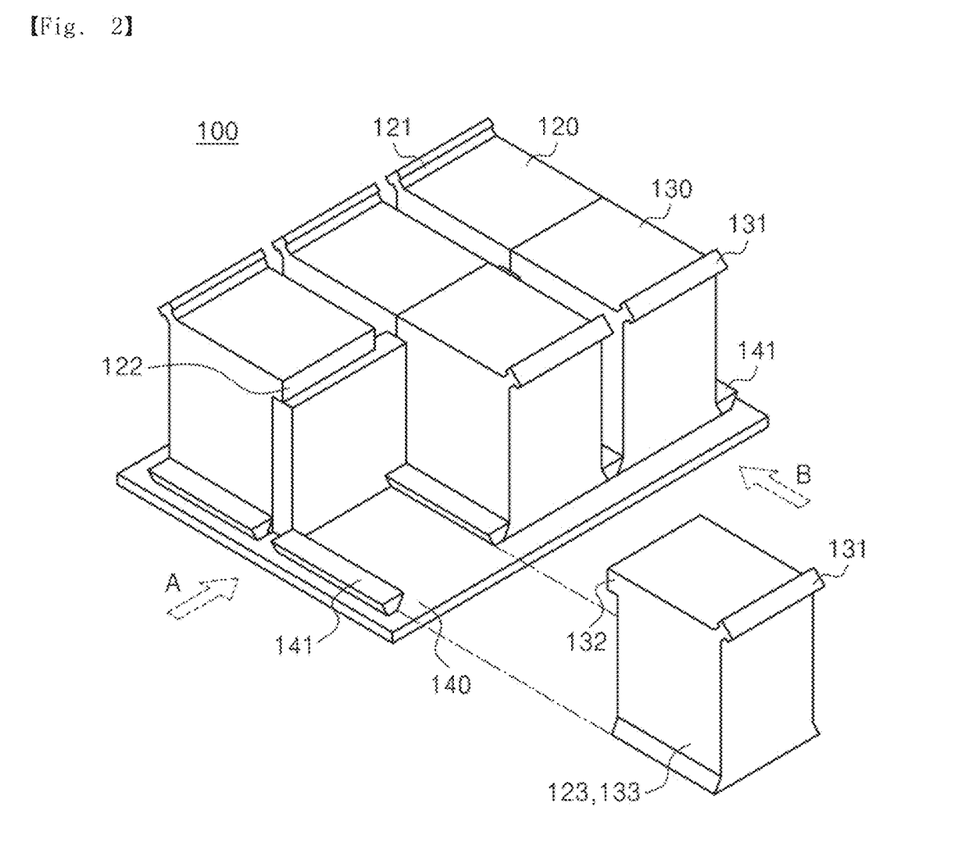
FIG. 2 is a perspective view illustrating a battery pack in accordance with one exemplary embodiment.

FIG. 2 is a perspective view illustrating a battery pack in accordance with one exemplary embodiment.

Figure 3:
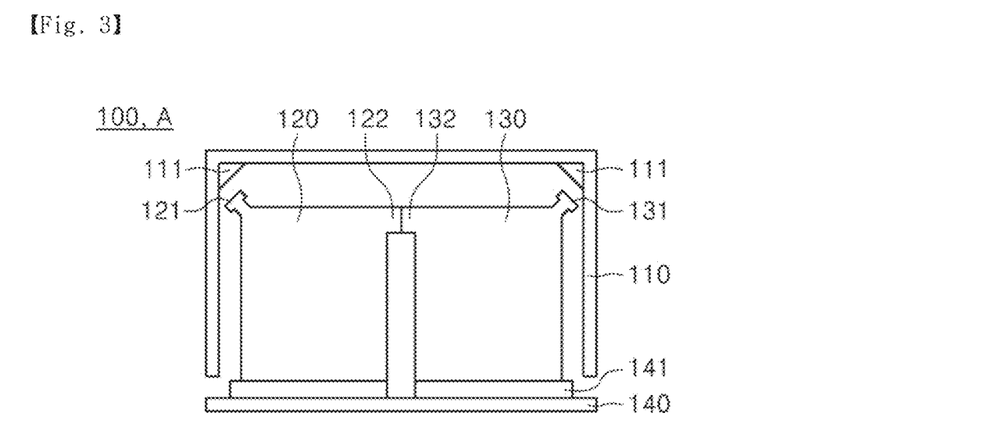
FIG. 3 is a front view illustrating the battery pack in accordance with one exemplary embodiment.

FIG. 3 is a front view illustrating the battery pack in accordance with one exemplary embodiment. Here, FIG. 3 is a view when viewed from a direction of A in FIG. 2.

Referring to FIGS. 2 and 3, a battery pack 100 in accordance with one exemplary embodiment has a shape configured by including a plurality of battery modules in which a plurality of battery cells are accommodated in a module case. The battery pack 100 includes an upper case 110, a first battery module 120, a second battery module 130, and a lower plate 140. The upper case 110 includes a top surface, both side surfaces, front and rear surfaces, and an opened bottom surface to accommodate the plurality of battery modules, wherein a chamfer 111 having a predetermined length is provided on a portion at which the top surface contacts the both side surfaces in a longitudinal direction of the side surface. The first battery module 120 includes: a first chamfer over-pressing preventing part 121 disposed at one side of an upper end of a first module case in the battery modules forming one row and extending in an upward diagonal direction from the module case in correspondence to the chamfer 111 of the upper case 110; and a first module over-pressing preventing part 122 disposed at the other side of an upper end of the first module case and extending in a side surface direction from the module case and fixed by contacting another adjacent battery module case. The second battery module 130 includes: a second chamfer over-pressing preventing part 131 disposed at one side of an upper end of a second module case in the battery modules forming another row and extending in an upward diagonal direction from the module case in correspondence to the chamfer of the upper case; and a second module over-pressing preventing part 132 disposed at the other side of an upper end of the second module case and extending in a side surface direction from the module case in correspondence to the first module over-pressing preventing part 132. The second battery module 130 is disposed adjacent to the first battery module. The lower plate 140 includes a plurality of module support parts for fixing a lower end of each of the first battery module 120 and the second battery module 130.

Although the battery pack herein includes two battery modules for convenience of description, the battery module in two rows may be provided in plurality.

The constitution of the battery pack 100 will be described below in more detail.

The upper case 110 includes the top surface, the both side surfaces, the front and rear surfaces, and the opened bottom surface to accommodate the plurality of battery modules, and the chamfer 111 having a predetermined length is provided on a portion at which the top surface contacts the both side surfaces in a longitudinal direction of the side surface. The upper case 110 will be described in more detail with reference to FIG. 4.

Figure 4:
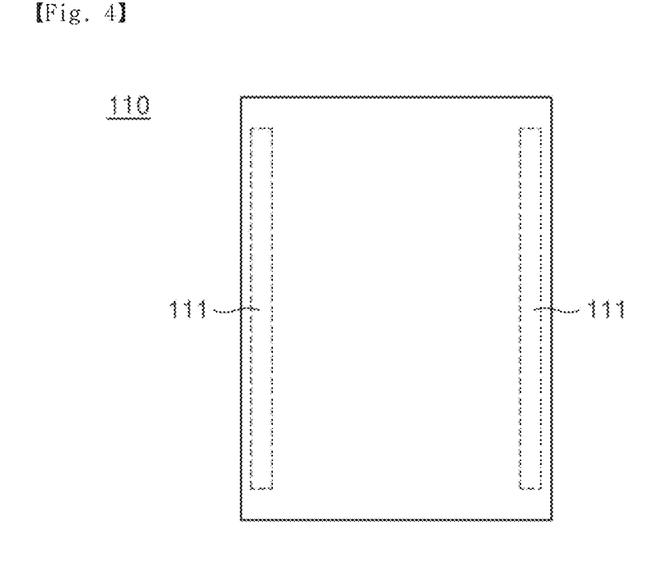
FIG. 4 is a plan view illustrating an upper case in the battery pack in accordance with one exemplary embodiment.

FIG. 4 is a plan view illustrating the upper case in the battery pack in accordance with one exemplary embodiment.

Referring to FIG. 4, the chamfer 111 is formed in the longitudinal direction of the side surface and allows the entire battery module to be fixed in top/bottom and left/right directions.

Also, a portion of the chamfer 111, which contacts the lower plate 140, is provided with a coupling component to be coupled to the lower plate 140.

Also, both side surfaces of the upper case 110 are bent inward to fix the battery pack in the side surface direction.

Also, a module fixing member 150 is further provided between the upper case and the first and second battery modules to fix the battery modules without moving in top/bottom directions. The module fixing member 150 is made of a compressible material to fix the battery pack in the top/bottom directions. The compressible material requires a feature in which a restoration force is not reduced even for long-term usage under a high temperature and high moisture environment.

Also, each of the first battery module 120 and the second battery module 130 is configured such that a plurality of battery cells are accommodated in a module case. The module case includes a plurality of fixing parts and fixing members so that the plurality of battery modules are fixed even when vibration is generated in top/bottom, left/right, and front/rear directions.

Also, as illustrated in FIG. 3, the first battery module 120 and the second battery module 130 are disposed adjacent to each other to form two rows.

The first battery module 120 and the second battery module 130 include: first and second chamfer over-pressing preventing parts 121 and 131, each of which is disposed at one side of an upper end of the module case and extends in an upward diagonal direction form the module case in correspondence to the chamfer 111 of the upper case; and first and second module over-pressing preventing parts 122 and 132, each of which is disposed at the other side of an upper end of the module case and extends in a side surface direction form the module case and fixed by contacting another adjacent battery module. The first and second module over-pressing preventing parts 122 and 132 may contact each other.

Referring to FIG. 3, in more detail, the first chamfer over-pressing preventing part 121 extends in a left upward direction from the first module case, and the second chamfer over-pressing preventing part 131 extends in a right upward direction from the second module case. Also, each of the first and second chamfer over-pressing preventing parts 121 and 131 has a shape corresponding to the chamfer 111 of the upper case 110.

Also, the first module over-pressing preventing part 122 extends in a right side surface direction from the first module case, and the second module over-pressing preventing part 132 extends in a left side surface direction from the second module case.

Also, as the first battery module 120 and the second battery module 130 are spaced a predetermined distance from each other, each of the first and second module over-pressing preventing part 122 and 132 has a length that is ½ of the spaced predetermined distance between the first and second battery modules 120 and 130.

Also, each of the first and second module over-pressing preventing part 122 and 132 may have a shape allowing insertion coupling to increase a coupling force. This will be described in more detail with reference to FIG. 5.

Figure 5:
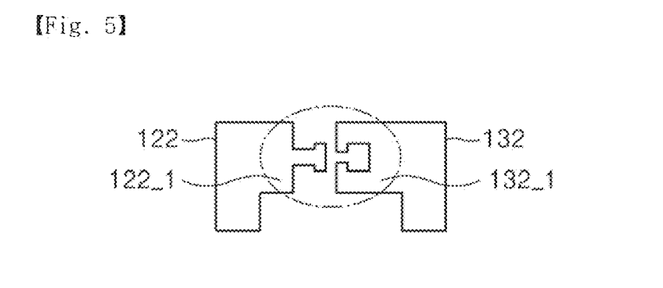
FIG. 5 is an enlarged view illustrating first and second module over-pressing preventing parts in the battery pack in accordance with one exemplary embodiment.

FIG. 5 is an enlarged view illustrating first and second module over-pressing preventing part in the battery pack in accordance with one exemplary embodiment. Here, FIG. 5 is a view when viewed from a direction of A in FIG. 2.

Referring to FIG. 5, the first module over-pressing preventing part 122 of the first battery module includes a protruding portion 122-1 for being insert-coupled to the second module over-pressing preventing part of the second battery module. The second module over-pressing preventing part 132 of the second battery module includes a recessed portion 132-1 corresponding to the protruding portion of the first module over-pressing preventing part or a protruding portion for being insert-coupled to the first module over-pressing preventing part of the first battery module. The first module over-pressing preventing part 122 of the first battery module includes a recessed portion corresponding to the protruding portion of the second module over-pressing preventing part.

The protruding portion and the recessed portion of the first and second module over-pressing preventing parts 122 and 132 increase the coupling force to prevent the coupling between the first and second module over-pressing preventing parts 122 and 132 from being released.

Although each of the protruding portion and the recessed portion has the shape as in FIG. 5, the one exemplary embodiment is not limited thereto. For example, each of the protruding portion and the recessed portion may have various shapes allowing forcible insert-coupling.

Also, although each of the first and second chamfer over-pressing preventing parts 121 and 131 and the first and second module over-pressing preventing parts 122 and 132 may be made of the same material as the module case of the battery module, one exemplary embodiment is not limited thereto. For example, each of the first and second chamfer over-pressing preventing parts 121 and 131 and the first and second module over-pressing preventing parts 122 and 132 may be made of different kinds of materials such as an elastic material.

Also, a lower end coupling part 123 and 133 may be provided on the lower end of the module case of each battery module part. This will be described in more detail with reference to FIG. 6.

Figure 6:
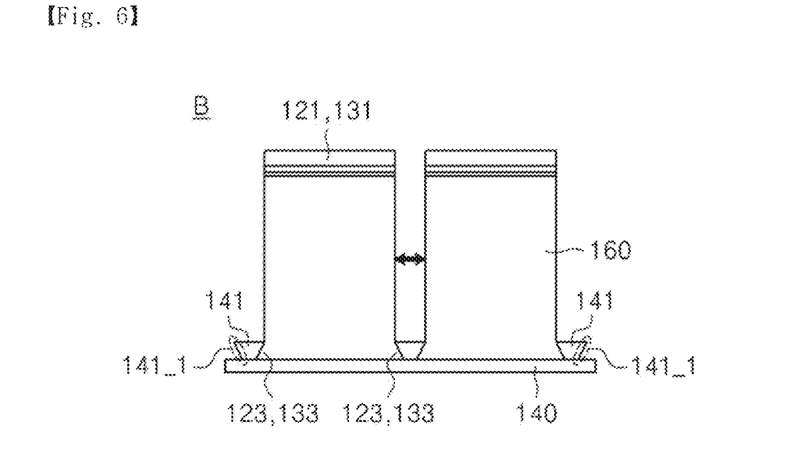
FIG. 6 is a side view illustrating the battery pack in accordance with one exemplary embodiment.

FIG. 6 is a side view illustrating the battery pack in accordance with one exemplary embodiment. Here. FIG. 6 is a view when viewed from a direction of B in FIG. 2.

Referring to FIG. 6, the lower end coupling part 123 and 133 is disposed on each of both side ends of the module case and has a shape corresponding to a module support part 141 of the lower plate 140.

The module support part 141 is inclined with respect to a perpendicular direction of the lower plate in order to form a module coupling surface 141_1 contacting the lower end coupling part 123 and 133 so that an outer surface of the lower end coupling part 123 and 133 is coupled to the module coupling surface of the module support part in a corresponding manner.

Also, the lower end coupling part 123 and 133 may have a shape of which a bottom surface increases in area for being sliding-coupled to the module support part 141 from one side to the other side of the side surface portion.

Also, when a plurality of battery modules are provided in the battery pack, a third battery module 160 is spaced by a size of the module support part 141.

Also, the lower plate 140 includes a plurality of module support parts 141 for fixing the lower end of each of the first and second battery modules. The number of the module support parts 141 is determined on the basis of the number of the battery modules provided in the battery pack.

Also, as each of the plurality of module support parts 141 has a shape in which a top surface is greater in area than a bottom surface, the module coupling surface 141_1 for the lower end of the battery module is inclined with respect to the perpendicular direction of the lower plate 140, and extends in a longitudinal direction from one side surface to the other side surface of the battery pack. Here, the bottom surface has an area to have a predetermined width, by which the module support part 141 may be fixed by the lower plate 140.

Also, when the module support part 141 extends in a longitudinal direction from one side surface to the other side surface of the battery pack, a central portion of the extended length may be spaced a predetermined distance by a separate component.

Also, a fixing type of the battery pack in accordance with one exemplary embodiment will be described with reference to FIG. 7.

Figure 7:
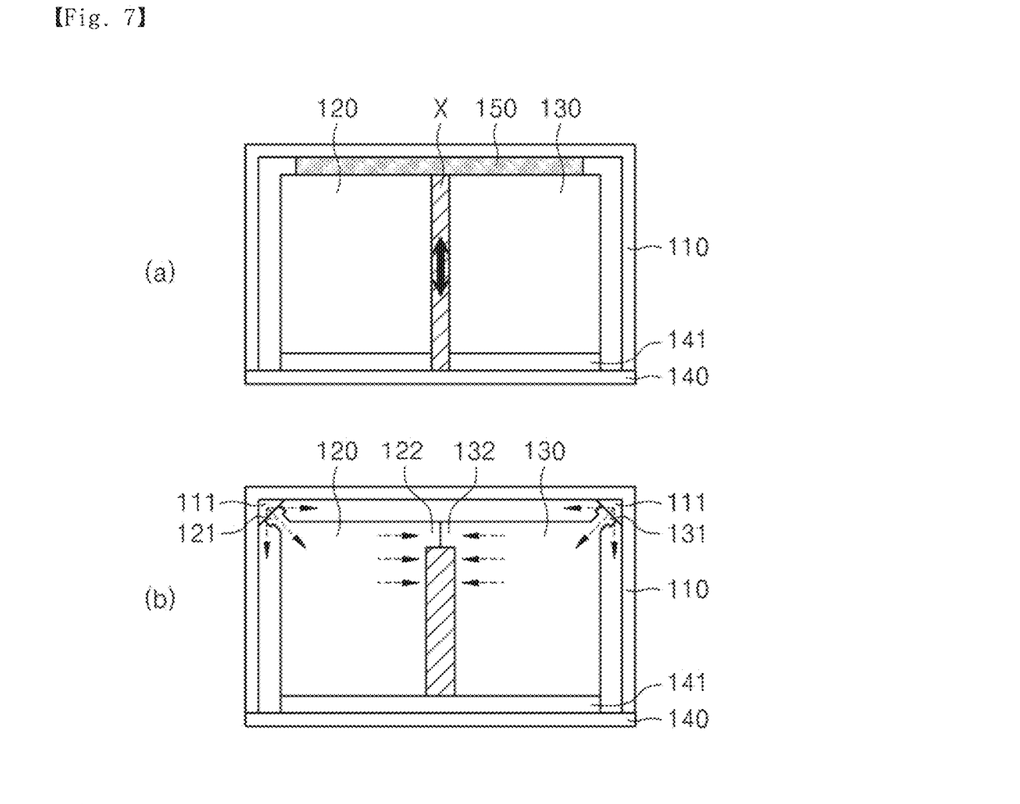
FIG. 7 is a view illustrating fixing types of battery packs in accordance with exemplary embodiments.

FIG. 7 is a view illustrating a fixing type of the battery pack in accordance with one exemplary embodiment.

Referring to FIG. 7, (a) of FIG. 7 is a view illustrating a state in which the module fixing member 150 is disposed above the first and second battery modules. The module fixing member 150 protects the battery pack when vibration or impact is generated in the top/bottom directions.

Also, (b) of FIG. 7 is a view illustrating directions of forces applied to the first and second chamfer over-pressing preventing parts 121 and 131 and the first and second module over-pressing preventing parts 122 and 132 when vibration or impact is generated in the top/bottom and left/right directions.

Since an inner empty space is not generated by the first and second chamfer over-pressing preventing parts 121 and 131 and the first and second module over-pressing preventing parts 122 and 132, less impact is generated to the battery module.

<Embodiment 2>

Thereafter, a battery pack in accordance with another exemplary embodiment will be described.

As a bent part, which is bent by a predetermined range, is provided at a lower end of the battery pack, and a module support part for fixing a battery module is partially disposed inside the bent part, the battery pack in accordance with another exemplary embodiment may decrease an entire length of the battery pack by decreasing a predetermined distance between the plurality of battery modules, which are disposed in one row in the one exemplary embodiment.

Figure 8:
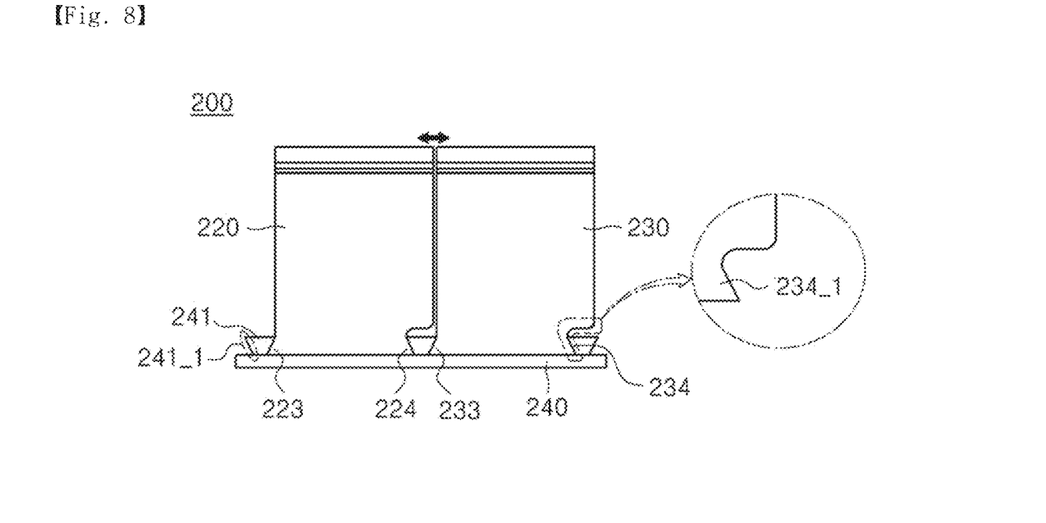
FIG. 8 is a side view illustrating a battery pack in accordance with another exemplary embodiment.

FIG. 8 is a side view illustrating the battery pack in accordance with another exemplary embodiment. Here, FIG. 8 is a view when viewed from a direction of B in FIG. 2.

Referring to FIG. 8, a battery pack 200 in accordance with another exemplary embodiment includes a plurality of battery modules in which a plurality of battery cells are accommodated in a module case and which are arranged in a row. The battery pack 200 includes a lower plate 240, a first battery module 220, and a second battery module 230. The lower plate 240 includes a plurality of module support parts 241 for fixing lower ends of the plurality of battery modules. The first battery module 220 includes: a first outer coupling part 223 disposed at one side lower end of a first module case in the battery module forming one row and extending in a side surface direction from the module case in correspondence to the module support part 241 of the lower plate 240; and a first bent part 224 disposed at the other side lower end of the first module case and bent by a predetermined range in an inward direction of the module case so that the module support part 241 of the lower plate 240 is partially disposed therein. The second battery module 230 is disposed next to the first battery module. The second battery module 230 includes: a second outer coupling part 233 disposed at one side lower end of a second module case in the battery module forming another row and extending in a side surface direction from the module case in correspondence to the module support part of the lower plate; and a second bent part 234 disposed at the other side lower end of the second module case and bent by a predetermined range in an inward direction of the module case so that the module support part 241 of the lower plate 240 is partially disposed therein.

Although the battery pack herein includes two battery modules disposed in one row for convenience of description, the battery module in two rows may be provided in plurality.

Also, like the one exemplary embodiment, an upper case 210 including a top surface, both side surfaces, front/rear surfaces, and an opened bottom surface to accommodate the first battery module 220 and the second battery module 230 may be further provided.

The constitution of the battery pack 200 will be described below in more detail.

Also, the lower plate 240 includes a plurality of module support parts 241 for fixing the lower ends of the plurality of battery modules. The number of the module support parts 241 is determined on the basis of the number of the battery modules provided in the battery pack.

Also, as each of the plurality of module support parts 241 has a shape in which a top surface is greater in area than a bottom surface, the module coupling surface 241_1 for the first outer coupling part 223 and the second outer coupling part 233 is inclined with respect to a perpendicular direction of the lower plate 240, and extends in a longitudinal direction from one side surface to the other side surface of the battery pack. Here, the bottom surface has an area to have a predetermined width, by which the module support part 241 may be fixed by the lower plate 240.

Also, when the module support part 241 extends in the longitudinal direction from one side surface to the other side surface of the battery pack, a central portion of the extended length may be spaced a predetermined distance by a separate component.

Also, each of the first battery module 220 and the second battery module 230 is configured such that a plurality of battery cells are accommodated in a module case. The module case includes a plurality of fixing parts and fixing members so that the plurality of battery modules are fixed even when vibration is generated in top/bottom, left/right, and front/rear directions.

Also, as illustrated in FIG. 3, the first battery module 220 and the second battery module 230 are disposed adjacent to each other to form two rows.

Firstly, the first battery module 720 includes a first outer coupling part disposed at one side lower end of the first module case in the battery module forming one row and extending in the side surface direction from the module case in correspondence to the module support part 241 of the lower plate. Also, a first bent part 224, which is bent by a predetermined range in an inward direction of the module case, is provided at the other side lower end of the first module case so that the module support part 241 of the lower plate 240 is partially disposed therein.

Also, the second battery module 230 includes a second outer coupling part 233 disposed at one side lower end of the second module case in the battery module forming another row next to the first battery module and extending in the side surface direction from the module case in correspondence to the module support part of the lower plate. Also, a second bent part 234, which is bent by a predetermined range in an inward direction of the module case, is provided at the other side lower end of the second module case so that the module support part 241 of the lower plate 240 is partially disposed therein.

In more detail, each of the first outer coupling part 223 and the second outer coupling part 233 is disposed at one side lower end of the module case and extends in the side surface direction from the module case in correspondence to the module support part 241 of the lower plate. Each of the first outer coupling part 223 and the second outer coupling part 233 is inclined with respect to a perpendicular direction of the lower plate so that an outer side surface is coupled to the module coupling surface 241_1 of the module support part in a corresponding manner.

Also, each of the first bent part 224 and the second bent part 234 is disposed at the other side lower end of the module case and bent by a predetermined range in an inward direction of the module case so that a body of the module support part 241 of the lower plate is partially disposed therein. The bent predetermined range is bent by an amount for accommodating the entire body of the module support part 241 or a portion of the body of the module support part 241.

The battery modules arranged in a row in FIG. 6 and in accordance with one exemplary embodiment are spaced by an area of the top surface of the module support part 241 to increase the length of the side surface of the battery pack.

To resolve above-described limitation, in accordance with another exemplary embodiment, as the first and second bent arts 224 and 234 are defined in the module case of the battery module to accommodate the module support part 241 inside the first battery module 220 and the second battery module 230, the distance between the battery modules arranged in a row may decrease.

Also, a first bent coupling part 224_1 extending in a side surface direction from the first module case is formed at a lower end of the first bent part 224 in correspondence to the module support part 241 of the lower plate, and a second bent coupling part 234_1 extending in a side surface direction from the second module case is formed at a lower end of the second bent part 234 in correspondence to the module support part 241 of the lower plate.

Also, each of the first outer coupling part 223, the second outer coupling part 233, the first bent coupling part 224_1, and the second bent coupling part 234_1 has an outer surface, which is inclined with respect to the perpendicular direction of the lower plate and thus coupled a module coupling surface 241_1 of the module support part in a corresponding manner, and is coupled to the module support part 241 in a sliding manner.

<Embodiment 3>

Thereafter, a battery pack in accordance with yet another exemplary embodiment will be described.

The battery pack in accordance with yet another exemplary embodiment may allow firm connection between the battery pack and a battery module as a plurality of battery modules are arranged in three or more rows, and the battery modules form a member corresponding to an inner empty space of the battery pack, and safely protect the connection between the battery pack and the battery module from vibration and impact.

Figure 9:
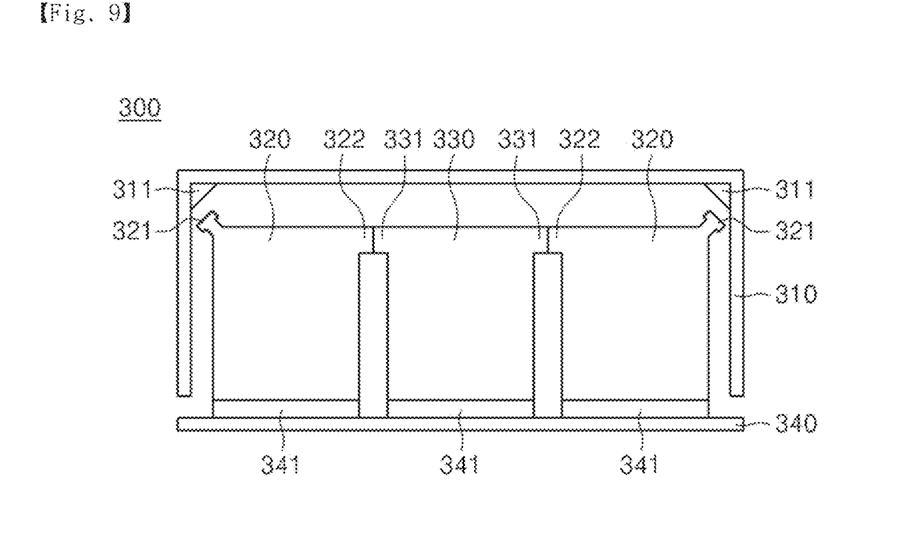
FIG. 9 is a front view illustrating a battery pack in accordance with yet another exemplary embodiment.

FIG. 9 is a front view illustrating the battery pack in accordance with yet another exemplary embodiment.

Referring to FIG. 9, a battery pack 300 in accordance with yet another exemplary embodiment includes an upper case 310 and a lower plate 340. The upper case 310 has a shape in which a plurality of battery modules, in which a plurality of battery cells are accommodated in a module case, are arranged in three rows or more. The upper case 310 includes a top surface, both side surfaces, front/rear surfaces, and an opened bottom surface to accommodate the plurality of battery modules, and a chamfer 311 having a predetermined length in a longitudinal direction of a side surface is provided on a portion at which the top surface contacts the both side surfaces. The lower plate 340 includes a plurality of module support parts 341 for fixing lower ends of the plurality of battery modules.

Also, each of side battery modules 320, which are arranged along the side surface of the longitudinal direction of the battery pack, includes a chamfer over-pressing preventing part 321 disposed at one side of an upper end of a side module case in the side battery module and extending in an upward diagonal direction from the module case in correspondence to the chamfer 311 of the upper case. Also, a first module over-pressing preventing part 322 which extends in a side surface direction from the module case, is provided at the other side of an upper end of the side case in the side battery module and fixed by contacting another adjacent module case.

Also, central battery modules 330 disposed between the side battery modules 320 include a second module over-pressing preventing part 331, which extends in a side surface direction from the module case, disposed at each of both side upper ends of the module case in the central battery module and fixed by contacting another adjacent battery module case. Each of the first module over-pressing preventing part 322 and the second module over-pressing preventing part 331 includes a coupling part, which is insert-coupled with the over-pressing preventing part of the adjacent battery module in a mutually corresponding manner.

Although the battery pack includes three battery modules for convenience of description, the central battery modules may include a plurality of battery modules. Also, the battery modules may be arranged in a plurality of rows and columns.

The constitution of the battery pack 300 will be described below in more detail.

The upper case 310, like the one exemplary embodiment, includes a top surface, both side surfaces, front/rear surfaces, and an opened bottom surface to accommodate the plurality of battery modules, and a chamfer 311 having a predetermined length is provided at a portion at which the top surface contacts the both side surfaces in a longitudinal direction of the side surface.

Also, the lower plate 340, like the one exemplary embodiment, includes a plurality of module support parts 341 for fixing lower ends of the side battery modules 320 and the central battery modules 330. The lower plate 340 extends from one side surface to the other side surface of the battery pack in the longitudinal direction.

However, when an additional component is provided between the battery modules, the module support parts 341 may be spaced a predetermined distance from each other.

Also, each of the plurality of module support parts 341 has a shape in which a top surface is greater in area than a bottom surface like the one exemplary embodiment and as in FIG. 6, and a module coupling surface 141_1 for the lower end of the battery module is inclined with respect to a perpendicular direction of the lower plate 140, 340.

Also, each of the side battery modules 320 and the central battery modules 330 is configured such that a plurality of battery cells are accommodated in a module case. The module case includes a plurality of fixing parts and fixing members so that the plurality of battery modules are fixed even when vibration is generated in top/bottom, left/right, and front/rear directions.

In more detail, each of the side battery modules 320 has the same shape as the one exemplary embodiment and as in FIG. 3. The side battery module 320 includes: a chamfer over-pressing preventing part 321 disposed at one side of an upper end of the side case in the side battery module and extending in an upward diagonal direction from the module case in correspondence to the chamfer 311 of the upper case; and a first module over-pressing preventing part 322 disposed at the other side of an upper end of the side case in the side battery module and extending in a side direction from the module case and fixed by contacting another adjacent battery module case.

The chamfer over-pressing preventing part 321 extends in a left upward direction or a right upward direction from the module case in correspondence to the chamfer 311 of the upper case so as to contact the chamfer 311.

Also, the first module over-pressing preventing part 322 will be described with the central battery modules 330.

Also, each of the central battery modules 330 includes a second module over-pressing preventing part 331 which extends in a side surface direction from the module case and is provided at each of the both side upper end of the module case in the central battery module so as to be fixed while contacting another module case adjacent thereto.

The first module over-pressing preventing part 322 and the second module over-pressing preventing part 331 may simply contact each other like the one exemplary embodiment and as in FIG. 3, or each may further include a coupling part, which is insert-coupled with the over-pressing preventing part of the adjacent battery module in a mutually corresponding manner.

As the coupling part is provided at each of both side upper ends of the module case in the second module over-pressing preventing part 331, a protruding portion is provided at one side of the both sides, and a recessed portion is provided at the other side of the both sides.

The coupling part provided to the first module over-pressing preventing part 322 forms a protruding portion on the battery module in one row among the side battery modules 320 and a recessed portion on the battery module in another row. Accordingly, the coupling parts of the first module over-pressing preventing parts 322 disposed on the battery modules disposed at both sides have different shapes from each other.

The protruding portion and the recessed portion of the coupling part increase a coupling force to prevent the coupling therebetween from being released even when vibration and impact are generated.

Also, a lower coupling part is provided at a lower end of each module case in the side battery modules 320 and the central battery modules 330 for being coupled to the lower plate 340, The lower coupling par may have two shapes as in the one exemplary embodiment and the another exemplary embodiment.

Firstly, a lower end coupling part 123 and 133, which is one exemplary embodiment of the lower coupling part, s disposed at each of both side lower ends of the module case in the side battery modules 320 and the central battery modules 330 and has a shape corresponding to the module support part 141 and 341 as in FIG. 6.

Accordingly, the lower end coupling part 123 and 133 is inclined with respect to the perpendicular direction of the lower plate 340 so that an outer surface of the lower end coupling part 123 and 133 is coupled to the module coupling surface 141_1 of the module support part 141 and 341 in a corresponding manner.

Also, the lower end coupling part 123 and 133 may have a shape of which a bottom surface increases in area for being sliding-coupled to the module support part 141 and 341 from one side to the other side of the side surface portion.

Also, when a plurality of battery modules are provided in the battery pack, a third battery module 160 is spaced by a size of the module support part 141.

Also, each of the first and second outer coupling parts 223 and 233, which is another exemplary embodiment of the lower coupling part, is disposed at one side lower end of the module case and extends in a side surface direction from the module case in correspondence to the module support part 241 and 341 of the lower plate. Each of the first and second outer coupling parts 223 and 233 is inclined with respect to the perpendicular direction of the lower plate so that the same outer surface as the lower end coupling part 123 and 133 is coupled to the module coupling surface 241_1 of the module support part in a corresponding manner.

Also, each of the first bent part 224 and the second bent part 234 is disposed at the other side lower end of the module case and bent by a predetermined range in an inward direction of the module case so that a body of the module support portion 241 and 341 of the lower plate is partially disposed therein. Each of the first and second bent parts is bent by an amount for accommodating the entire body of the module support part 241 and 341 or a portion of the body of the module support part 241 and 341.

Also, first and second bent coupling parts 224_1 and 234_1, each of which extends in the side surface direction from the module case in correspondence to the module support part 241 and 341 of the lower plate, are provided at lower ends of the first and second bent parts 224 and 234, respectively.

Also, each of outer surfaces of the first and second bent coupling parts 224_1 and 234_1 is inclined with respect to the perpendicular direction of the lower plate and coupled to the module coupling surface 141_1 of the module support part in a corresponding manner. Accordingly, the first and second bent coupling parts 224_1 and 234_1 may be sliding-coupled with the module support parts 241 and 341, respectively.

As described above, in accordance with the one exemplary embodiment, the battery modules arranged in a row are spaced by the area of the top surface of the module support part 241 and 341 to increase the length of the side surface of the battery pack. To resolve the above limitation, in accordance with the another exemplary embodiment, as the first and second bent parts 224 and 234 are defined at one side lower end of the module case, the module support part 241 and 341 may be disposed inside of the first battery module 220 and the second battery module 230.

The battery pack including the fixing part in accordance with one exemplary embodiment may include the fixing part and the fixing member to fill the empty space, which is generated in the battery pack, and firmly fix the battery module to the battery pack case, thereby safely driving the battery pack.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A battery pack, which comprises a plurality of battery modules in which a plurality of battery cells are accommodated in a module case, comprising:
    an upper case having a top surface, both side surfaces, front/rear surfaces, and an opened bottom surface to accommodate the plurality of battery modules, wherein a chamfer having a predetermined length is provided on each of portions at which the top surface contacts the both side surfaces in a side longitudinal direction;
    a first chamfer over-pressing preventing part disposed at one side of an upper end of a first module case in the battery modules forming one row and extending in an upward diagonal direction from the module case in correspondence to the chamfer of the upper case;
    a first battery module comprising a first module over-pressing preventing part disposed at the other side of the upper end of the first module case and extending in a side direction from the module case;
    a second chamfer over-pressing preventing part disposed at one side of an upper end of a second module case in the battery modules forming another row and extending in an upward diagonal direction from the module case in correspondence to the chamfer of the upper case;
    a second battery module comprising a second module over-pressing preventing part disposed at the other side of the upper end of the second module case and extending in a side direction from the module case; and
    a lower plate comprising a plurality of module support parts each having a wider top than bottom such that adjacent ones of the module support parts define a channel in a longitudinal direction parallel to a surface of the lower plate, the channel having open ends to slidably receive the first and second modules to fix a lower end of each of the first battery module and the second battery module.

2. The battery pack of claim 1, wherein as each of the plurality of module support parts has a top surface greater in area than a bottom surface, a module coupling surface, which is coupled to a lower end of the battery module, is inclined with respect to a perpendicular direction of a surface of the lower plate, and the module support part extends in the longitudinal direction from one side surface to the other side surface of the battery pack.

3. The battery pack of claim 1, wherein each of the first battery module and the second battery module further comprises a lower end coupling part, which has a shape corresponding a module support part of the lower plate, disposed at both side ends of the module case, and
    an outer surface of the lower coupling part is inclined with respect to a perpendicular direction of the lower plate so that the outer surface of the lower coupling part is coupled to a module coupling surface of the module support part in a corresponding manner.

4. The battery pack of claim 1, wherein a first module over-pressing preventing part of the first battery module comprises a protruding portion so as to be coupled with a second module over-pressing part of the second battery module,
    the second module over-pressing preventing part of the second battery module comprises a recessed portion so as to be coupled with the protruding portion of the first over-pressing part,
    the second module over-pressing preventing part of the second battery module comprises a protruding portion so as to be coupled with the first over-pressing part of the first battery module, and
    the first module over-pressing preventing part of the first battery module comprises a recessed portion so as to be coupled with the protruding portion of the second over-pressing part.

5. The battery pack of claim 1, further comprising a module fixing member provided between the upper case and the first and second battery modules to prevent the battery modules from moving in top/bottom directions.

6. The battery pack of claim 5, wherein the module fixing member is made of a compressible material.

7. The battery pack of claim 1, wherein the first chamfer over-pressing preventing part is configured to apply a force in the longitudinal direction to the first module over-pressing prevention part and the second chamfer over-pressing preventing part is configured to apply a force in the longitudinal direction to the first module over-pressing prevention part so that the first and second battery modules are fixed by contacting each other.

8. A battery pack, which comprises a plurality of battery modules in which a plurality of battery cells are accommodated in a module case and which are arranged in a row, comprising:
    a lower plate comprising a plurality of module support parts such that adjacent ones of the module support parts define a channel in a longitudinal direction parallel to a surface of the lower plate, the channel having open ends;
    a first outer coupling part disposed at one side of a lower end of a first module case in the battery modules forming one row and extending in a side direction from the module case in correspondence to the module support part of the lower plate;

a first battery module comprising a first bent part disposed at the other side of the lower end of the first module case and bent by a predetermined range in an inward direction of the module case so that a body of the module support part of the lower plate is partially disposed therein;

a second outer coupling part disposed at one side of a lower end of a second module case in the battery modules forming another row while being disposed next to the first battery module and extending in a side direction from the module case in correspondence to the module support part of the lower plate; and a second battery module comprising a second bent part disposed at the other side of the lower end of the second module case and bent by a predetermined range in an inward direction of the module case so that the body of the module support part of the lower plate is partially disposed therein, wherein the first bent part and the first outer coupling part are configured to be to slidably received into a first channel and the second bent part and the second outer coupling part are configured to be to slidably received into a second channel such that the first and second battery modules contact each other.

9. The battery pack of claim 8, wherein as each of the plurality of module support parts has a top surface greater in area than a bottom surface, a module coupling surface, which is coupled to each of the first outer coupling part and the second outer coupling part, is inclined with respect to a perpendicular direction of a surface of the lower plate.

10. The battery pack of claim 8, wherein the module support part extends in a longitudinal direction from one side surface to the other side surface of the battery pack.

11. The battery pack of claim 8, wherein the first battery module comprises a first bent coupling part disposed at a lower end of the first bent part and extending in a side direction from the first module case in correspondence to the module support part of the lower plate, the second battery module comprises a second bent coupling part disposed at a lower end of the second bent part and extending in a side direction from the module case in correspondence to the module support part of the lower plate, and an outer surface of each of the first outer coupling part, the second outer coupling part, the first bent coupling part, and the second bent coupling part is inclined with respect to a perpendicular direction of the lower plate so as to be coupled to a module coupling surface of the module support part in a corresponding manner.

12. The battery pack of claim 8, wherein each module support part has a width at a top surface greater than a width at a bottom surface.

13. A battery pack, which comprises a plurality of battery modules in which a plurality of battery cells are accommodated in a module case and which are arranged in three rows or more, comprising:

side battery modules, which are arranged on a side surface of the battery pack in a longitudinal direction, comprising a chamfer over-pressing preventing part disposed at one side of an upper end of a side module case in the side battery modules and extending in an upward diagonal direction from the side module case in correspondence to a chamfer provided on an inner corner of an upper case accommodating the plurality of battery modules, and a first module over-pressing preventing part disposed at the other side of the upper end of the side module case in the side battery modules and extending in a side direction from the side module case so as to be fixed while contacting another battery module case adjacent thereto; and at least one central battery module, which is disposed between the side battery modules, comprising second module over-pressing preventing parts disposed at each of both sides of an upper end of a central module case in the at least one central battery module and extending in the side direction from the central module case, wherein the chamfers are each configured to apply a force to the respective module over-pressing prevention parts so that the side battery modules are each pressed in the side direction toward the at least one central battery module, and wherein the side battery modules and the at least one central battery module are pressed together.

14. The battery pack of claim 13, further comprising:

a lower plate comprising a plurality of module support parts fixing a lower end of each of the plurality of battery modules, wherein the upper case has a top surface, both side surfaces, front/rear surfaces, and an opened bottom surface to accommodate the side battery modules and the central battery modules, and wherein the chamfer has a predetermined length and is provided on each of portions at which the top surface contacts the both side surfaces in a side longitudinal direction.

15. The battery pack of claim 14, wherein as each of the plurality of module support parts of the lower plate has a top surface greater in area than a bottom surface, a module coupling surface, which is coupled to a lower end of the battery module, is inclined with respect to a perpendicular direction of a surface of the lower plate, and a lower end coupling part is provided at each of both side ends of a lower end of the module case in the side battery modules and the central battery modules, and inclined with respect to a perpendicular direction of the lower plate so that the outer surface is coupled to the module coupling surface of the module support part.

16. The battery pack of claim 14, wherein as the module support part of the lower plate has a top surface greater in area than a bottom surface, a module coupling surface, which is coupled to a lower end of the battery module, is inclined with respect to a perpendicular direction of a surface of the lower plate, a bent part, which is bent by a predetermined range in an inward direction of the module case, is provided at one side end of the lower end of the module case in the side battery modules and the central battery modules so that a body of the module support part of the lower plate is partially disposed therein, a coupling part, which is inclined with respect to a perpendicular direction of the lower plate, is provided at the other side end of the lower end of the module case in the side battery modules and the central battery modules so that an outer surface is coupled to a module coupling surface of the module support part in a corresponding manner.

17. The battery pack of claim 16, wherein the bent part comprises a bent coupling part, which is inclined with respect to the perpendicular direction of the lower plate so that the outer surface of the lower end is coupled to the module coupling surface of the module support part in a corresponding manner.

18. The battery pack of claim 13, wherein each of the first module over-pressing preventing part and the second module over-pressing preventing part comprises a coupling part that is insert-coupled with an over-pressing preventing part of the battery module adjacent thereto.

\* \* \* \* \*